United States Patent Office

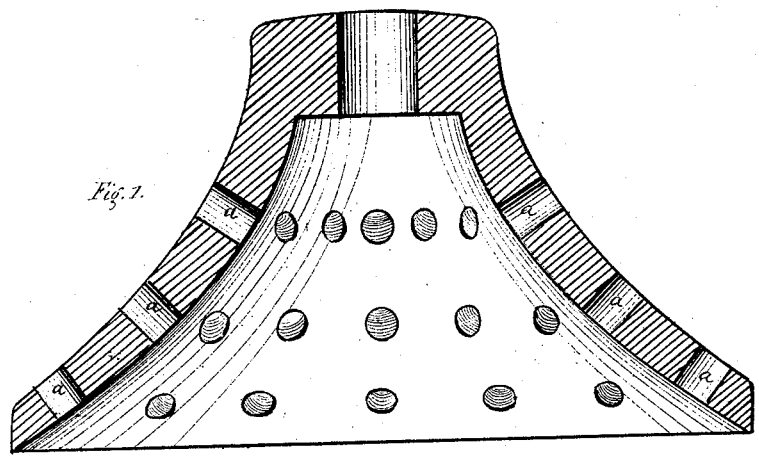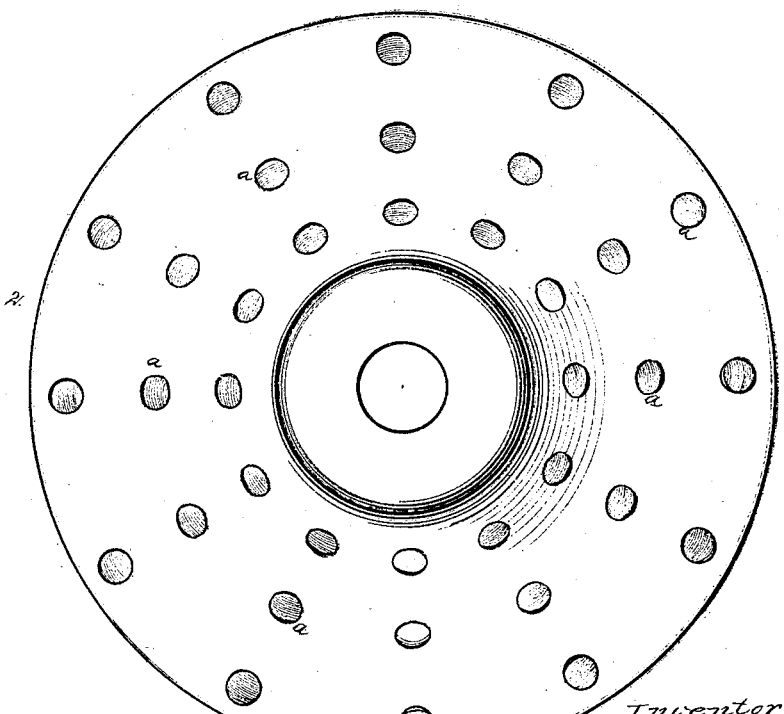

DANIEL F. WALLACE AND DANIEL T. COCKERILL, OF RIPLEY, OHIO.

*Letters Patent No. 67,617, dated August 6, 1867.*

IMPROVEMENT IN CHURN-DASHERS.

*The Schedule referred to in these Letters Patent and making part of the same.*

TO WHOM IT MAY CONCERN:

Be it known that we, DANIEL F. WALLACE and DANIEL T. COCKERILL, of Ripley, Brown county, in the State of Ohio, have invented certain new and useful improvements in Churn-Dashers; and we do hereby declare the following to be a full and exact description of the same, reference being had to the drawings that accompany and form a part of these specifications, in which—

Figure I, sectional elevation.

Figure II, plan.

Letters $a$ $a$, openings through the sides of dash.

The leading feature of our invention is in having a "bell-shaped dasher" provided with more or less holes, $a$ $a$, leading from the exterior to the interior surface, the axis of each of these openings being perpendicular to a tangent at the point of the cone where the hole is located.

The object of our invention is to furnish a churn-dash so constructed that, though producing great agitation of the cream, shall be easy to operate, the form being such as to throw off the bulk of the cream when the dasher is raised; the directions of the openings being so situated that as the cream is forced through them the streams cross and commingle with each other, and thus agitate and break up the cream in a most perfect manner. Another advantage in the bell shape is the under side being concave. It serves to more readily collect the particles of butter as they are formed into one mass under the dasher at the bottom of the churn.

What we claim as our invention, and desire to secure by Letters Patent, is—

A churn-dasher in form substantially as set forth, when provided with the openings $a$ $a$ $a$, so arranged that the several axes of each of the groups $h$ $h$ $h$ shall converge outwardly, as and for the purposes specified.

DANIEL F. WALLACE,
DANIEL T. COCKERILL.

Witnesses:
G. BUMBACH,
ELBERT H. SMITH.